United States Patent [19]

Wilson et al.

[11] Patent Number: 4,661,117

[45] Date of Patent: * Apr. 28, 1987

[54] WATERLESS DIP DYE COMPOSITION AND METHOD OF USE THEREOF FOR SYNTHETIC ARTICLES

[75] Inventors: Robert B. Wilson, Greenville, S.C.; William F. Pomeroy, Rocky Mount, N.C.; Louis T. Sovey, Jr., Spartanburg, S.C.

[73] Assignee: Crucible Chemical Company, Greenville, S.C.

[*] Notice: The portion of the term of this patent subsequent to Apr. 28, 2004 has been disclaimed.

[21] Appl. No.: 669,355

[22] Filed: Nov. 8, 1984

Related U.S. Application Data

[63] Continuation-in-part of Ser. No. 574,953, Jan. 30, 1984, abandoned, which is a continuation-in-part of Ser. No. 440,567, Nov. 10, 1982, abandoned.

[51] Int. Cl.$^4$ .............................................. D06P 5/00
[52] U.S. Cl. .......................................... 8/506; 8/497; 8/499; 8/508; 8/509; 8/510; 8/512; 8/513; 8/515; 8/516; 8/583; 8/613; 8/922; 8/924; 8/926; 8/927; 8/928
[58] Field of Search ................... 8/506, 499, 508, 509, 8/512, 515, 516, 583, 510, 513, 613

[56] References Cited

U.S. PATENT DOCUMENTS

| | | | |
|---|---|---|---|
| 4,293,305 | 10/1981 | Wilson | 8/115.6 |
| 4,394,126 | 7/1983 | Wilson | 8/115.6 |
| 4,426,297 | 1/1984 | Wilson | 252/8.6 |
| 4,459,704 | 7/1984 | Sears et al. | 2/69 |

Primary Examiner—A. Lionel Clingman
Attorney, Agent, or Firm—Bailey & Hardaway

[57] ABSTRACT

A waterless dip dye composition for non-textile and general-utility articles comprises an aromatic ester of the formula $ArCOOR_2$, $ArCOO-R_1-OOCAr$ or $(ArCOO)_z-R_3$, wherein $R_1$ is alkylene of 2–8 carbon atoms or polyoxyalkylene of the formula $-C_rH_{2r}(OC_rH_{2r})_s$, in which r is 2 or 3 and s is 1 to 15; $R_2$ is substituted or unsubstituted alkyl or alkenyl of 8–30 carbon atoms; $R_3$ is the residue of a polyhydric alcohol having z hydroxyl groups; Ar is substituted or unsubstituted mono- or bicyclic aryl of up to 15 carbon atoms and z is 3–6, admixed with at least 0.5% by weight of a dyeing assistant agent and an organic colorant.

A process for coloring non-textile and general-utility articles, fabricated from polyester, polyamide, polyurethane, acrylic, halogenated polyolefin or epoxy plastic, comprises exposing an article to the foregoing compositions, maintained at a temperature from about 100° C. to the temperature at which the plastic degrades, for a time adequate to achieve the desired degree of coloration.

26 Claims, 1 Drawing Figure

WATERLESS DIP DYE COMPOSITION AND METHOD OF USE THEREOF FOR SYNTHETIC ARTICLES

REFERENCE TO RELATED APPLICATIONS

This is a continuation-in-part of Ser. No. 06/574,953, filed Jan. 30, 1984, now abandoned, which is a continuation-in-part of Ser. No. 06/440,567, filed Nov. 10, 1982, now abandoned.

Wilson, U.S. Pat. No. 4,529,405 discloses waterless dye compositions, based on bisterephthalate diesters of alkylphenoxypolyoxyethanol and an organic colorant.

Wilson, U.S. Pat. No. 4,608,056 discloses waterless dye composition, based on an aromatic polyester of the formula $C_6H_{z'}(COOR_1)_z$, wherein $R_1$ is higher alkyl, z is 3, 4, 5 or 6 and z' is 6-z.

Wilson, U.S. Pat. No. 4,581,035 discloses a waterless dye composition, comprising a triglyceride and an organic solvent.

TECHNICAL FIELD

This invention relates to waterless compositions, particularly adapted for immersion coloring of plastic articles, intended for non-texile or general-utility use.

BACKGROUND ART

The use of a glycol ether or glycol ester in a dyeing composition has been disclosed, for example, in the following U.S. Pat. Nos.:

| | |
|---|---|
| 1,891,520 | Bowley |
| 1,927,145 | Whitehead |
| 1,977,345 | Moore et al. |
| 2,537,177 | Woodruff |
| 2,723,899 | Toulmin, Jr. |
| 3,009,760 | Lenz et al. |
| 3,607,358 | Dangl et al. |
| 3,635,652 | Streck |
| 4,047,889 | Hermes |
| 4,055,971 | Hermes |
| 4,115,054 | Hermes |

References disclosing the use of glycols or glycerol as media for dyeing compositions include U.S. Pat. Nos.:

| | |
|---|---|
| 2,302,760 | Goodman, Jr. |
| 2,320,426 | Goodman, Jr. |
| 2,882,119 | Laucius et al. |
| 3,241,906 | Smith et al. |
| 3,901,648 | Arbaud |
| 4,245,991 | Haddad et al. |

Popp et al. (U.S. Pat. No. 3,864,077), have proposed a non-aqueous dyestuff composition, containing a water-soluble or water-dispersible dyestuff, a lower dialkyl phthalate, a dispersing agent and tetrachloroethylene or other halogenated hydrocarbon. The dyeing process appears to require either extended immersion in the dyebath or heat treatment after dyeing.

Hermes (U.S. Pat. No. 3,943,105) has proposed using glycols or polyhydric alcohols in a process for treating polyester with an ultraviolet absorber.

Hermes, in U.S. Pat. No. 3,530,214, has disclosed a process for heat setting of textiles, wherein a fabric web of synthetic fibers is treated in a heated liquid bath of a polyhydric alcohol, alkylene carbonate or mixture thereof.

Inclusion of lower phthalates in lubricants or other textile-treating compositions is disclosed by Jaeger (U.S. Pat. No. 2,212,369), Brennan et al. (U.S. Pat. No. 2,882,231) and Iyengar et al. (U.S. Pat. No. 3,853,607).

Of these, the Hermes '889, '971 and '054 references appear of most interest with respect to clean, economically feasible waterless dyeing, particularly of textiles.

The use of ethoxylated materials for coloring of objects has been disclosed by Lenz et al. (U.S. Pat. No. 3,362,779) and Kressner et al. (U.S. Pat. No. 4,332,587).

Compositions containing esterified derivatives of a Diels-Alder adduct of linoleic acid and acrylic acid, intended for use in various textile-treating compositions, have been disclosed by Wilson, in U.S. Pat. Nos. 4,293,305, and 4,394,126, incorporated herein by reference.

Although a variety of solvent systems have been suggested for dyeing of articles in waterless systems, none presently available provides rapid, failure-free dyeings, which are done without producing obnoxious effluents or otherwise being unacceptable from a commercial viewpoint.

It is object of this invention to provide a composition for waterless immersion coloring of plastic articles, intended for non-texile and general-utility purposes. Such articles include, but are not limited to plastic tubing and pipe, plastic coated wire, ropes, polyester and polyamide chips, metals coated with synthetic resins, flowers made of synthetic resins, synthetic resin films, toys, synthetic resin constructions used in cars and planes, housings for pencils and pens, kitchen utensils and telephones.

It is a further object of this invention to provide a method for rapid waterless coloring of non-texile and general-utility articles. Yet another object of this invention is to provide an apparatus suitable for waterless coloring of articles made from plastics.

DISCLOSURE OF INVENTION

In one aspect, this invention relates to a waterless dip dye composition for non-textile and general-utility articles, comprising an aromatic ester of the formula ArCOOR$_2$, ArCOO—R$_1$—OOCAr or (ArCOO)$_z$—R$_3$, wherein R$_1$ is alkylene of 2–8 carbon atoms or polyoxyalkylene of the formula —C$_r$H$_{2r}$(OC$_r$H$_{2r}$)$_s$, in which r is 2 or 3 and s is 1 to 15; R$_2$ is substituted or unsubstituted alkyl or alkenyl of 8–30 carbon atoms; R$_3$ is the residue of a polyhydric alcohol having z hydroxyl groups; Ar is substituted or unsubstituted mono or bicyclic aryl of up to 15 carbon atoms and z is 3–6, admixed with at least 0.5% by weight of a dyeing assistant composition and an organic colorant.

In another aspect, this invention relates to a waterless dip dye composition for non-textile and general-utility articles, comprising a thermally-stable, high boiling, non-smoking organic solvent vehicle, free of glycols, glycol ethers, lower alkyl phthalates of dialkyl carbonates, admixed with at least 0.5% by weight of a dyeing assistant agent and an organic colorant.

In a further aspect, this invention relates to a process for waterless coloration of non-textile, general utility articles, fabricated from a plastic material, comprising exposing an article to the foregoing compositions, maintained at a temperature from about 100° C. to the temperature at which the plastic degrades, for a time adequate to achieve the desired degree of coloration.

"Aromatic ester," as used in the specification and claims, means an ester formed by reaction between a mono-, di- or polyhydric alcohol and an aromatic acid, so as to accomplish complete esterification of all hydroxyl functions therein. Compounds within this class include esters of the formula ArCOOR$_2$, wherein Ar is substituted or unsubstituted mono- or bicyclic aryl of up to 15 carbon atoms and R$_2$ is substituted or unsubstituted alkyl or alkenyl of 8–30 carbon atoms. Also included within the definition of aromatic esters are those of the formula AR—COO—R$_1$—OOCAr, wherein AR is as above and R$_1$ is alkylene of 2–8 carbon atoms or polyoxyalkylene of the formula —C$_r$H$_{2r}$(O—C$_r$H$_{2r}$)$_s$, in which r is 2 or 3 and s is 1 to 15.

Accordingly, aromatic esters used in this aspect of the invention include, but are not limited to, esters of benzoic, toluic, dimethylbenzoic, trimethylbenzoic, naphthoic, butylbenzoic and similar acids.

In the practice of this invention, the foregoing types of esters will preferably be used in combination with a cycloaliphatic diester of the formula

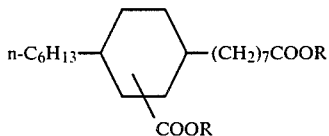

wherein R is substituted or unsubstituted straight or branched chain alkyl of 4–20 carbon atoms, polyoxyalkylene of the formula HO(C$_x$H$_y$O)$_n$C$_x$H$_y$— or phosphated polyoxyalkylene of the formula (HO)$_2$P(=O)O(C$_x$H$_{2x}$O)$_n$C$_x$H$_{2x}$ or a salt thereof, wherein (C$_x$H$_{2x}$O)$_n$ is (CH$_2$CH$_2$O)$_n$, (C$_3$H$_6$O)$_n$ or (CH$_2$CH$_2$O)$_p$—(C$_3$H$_6$O)$_q$ and n is 2–22. Other cycloaliphatic diester compounds which can be used are those wherein R is ArCOO(CH$_2$CH$_2$O)$_n$CH$_2$CH$_2$—, ArCOO(C$_3$H$_6$O)$_n$C$_3$H$_6$—, ArCOO(C$_2$H$_4$O)$_p$(C$_3$H$_6$O)$_q$C$_3$H$_6$— or ArCOO(C$_3$H$_6$O)$_p$(C$_2$H$_4$O)$_q$C$_2$H$_4$— and n, p, q and Ar are as above. Preferred compositions of this invention will contain at least 5% by weight of this type of cycloaliphatic diester.

Preferred aromatic esters employed in the practice of this invention include those based on tri- or polyhydric alcohols, such as glycerol, trimethylolpropane, pentaerythritol, diglycerol, sorbitol, mannitol, and the like. The aromatic acids used for esterification are as above. When esters of this type are used, it has been found that entirely acceptable dyeings can be obtained, without the use of a cycloaliphatic diester, required for good results in combination with aromatic esters of mono- and dihydric alcohols. Aromatic esters of tri- and polyhydric alcohols can be represented by the formula (ArCOO)$_z$—R$_3$, wherein R$_3$ is the residue of a polyhydric alcohol having z hydroxyl groups and z is 3–6.

When aromatic diesters of dihydric alcohols are used, alkylene (R$_1$) can be ethylene, propylene, hexylene, 2,2-dimethyltrimethylene, butylene, heptamethylene and octylene, including various isomers thereof.

Polyoxyalkylene diesters include those derived from polyethylene glycol or polypropylene glycol.

In the case of aromatic esters of monohydric alcohols, alkyl (R$_2$) can be octyl, nonyl, decyl, dodecyl, tridecyl, hexadecyl, stearyl and alkenyl can be any corresponding monounsaturated function, e.g., oleyl.

Preferred among aromatic esters of mono-or dihydric alcohols are those wherein:

(a) Ar is phenyl,
(b) Ar is tolyl,
(c) R$_1$ is ethylene or propylene, including each of (a) and (b),
(d) R$_1$ is ethyleneoxyethylene or propyleneoxypropylene, including each of (a) and (b),
(e) R$_1$ is polyoxypropylene of molecular weight 200–250, including each of (a) and (b), and
(f) R$_2$ is decyl, dodecyl, hexadecyl, tridecyl, octadecyl or oleyl, including each of (a) and (b).

Contemplated equivalents of the aromatic esters described above include esters of benzyl alcohol and substituted or unsubstituted aromatic acids of 6 or more carbon atoms, or substituted or unsubstituted aliphatic acids of 8 or more carbon atoms, including but not limited to, benzyl laurate, benzyl pelargonate, benzyl octoate, benzyl palmitate, benzyl stearate, benzyl oleate, benzyl hydroxystearate or benzyl benzoate. It will be understood that esters of substituted benzyl alcohols can also be used.

Preferred aromatic esters based on trihydric or polyhydric alcohols are those of glycerol, trimethylolpropane or pentaerythritol. Most preferred are benzoate or toluate esters. It will be understood that mixtures of aromatic acids can be used to prepare any of the aromatic esters used in the practice of this invention.

The dibasic cycloaliphatic acid employed in making the compositions of this invention is a Diels-Alder adduct of acrylic acid and linoleic acid and can be prepared as described by Ward in U.S. Pat. No. 3,753,968. The diacid has the formula

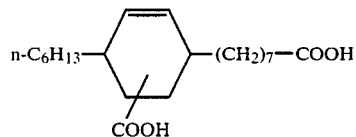

and therefore is a mixture of (5 and 6)-carboxy-4-hexyl-2-cyclohexene-1-octanoic acids. The diacid is available commercially from Westvaco, designated as "Diacid 1550".

Preparation of adducts from conjugated octadecadienoic acid and unsaturated acids and/or their hydrogenation has also been described by Teeter et al. J. Org. Chem., vol. 22 (1957) at 512–514, Ward in U.S. Pat. No. 3,988,476 and Ward et al in U.S. Pat. No. 3,981,682.

The preparation of esters from the C$_{21}$ diacid adduct was reported by Ward et al, J. Amer. Oil Chemists' Soc., vol. 57 (1957) at 219–224. Ethoxylated esters containing 4–119 ethylene oxide units are said to be effective lime soap dispersants. The alkyl esters are reported as being useful in lubricant applications, including users as textile lubricants and plasticizers for PVC.

The diacid can be esterified with alcohols using, for example, acidic catalysts such as p-toluenesulfonic acid, methanesulfonic acid or sulfuric acid. During the esterification, the reaction mixture is preferably also treated with a decolorizing agent, e.g., carbon or clay.

The diacid is reduced following esterification to a saturated compound cycle. A nickel catalyst such as Raney Nickel, nickel on kieselguhr or nickel on alumina can be used. The required amount varies up to 5–10% by weight of the ester.

Hydrogenation is carried out after esterification to prevent nickel from complexing with the free acid. Other catalysts, e.g., platinum or rhodium, avoid this problem, but are prohibitive in cost. The catalyst can be removed by filtration through a plate and frame filter press. The product is the resulting filtrate.

Polyoxyalkylene diesters are prepared by reaction of the diacid, in the presence of an alkaline catalyst, with ethylene or propylene oxide. Reaction will occur at both acid sites. Addition of ethylene oxide is allowed to continue until the product becomes at least dispersible or, preferably, soluble in water. This will correspond to addition of a total of 5-25 ethylene oxide units. The product obtained using ethylene oxide has a structure before hydrogenation represented by the formula:

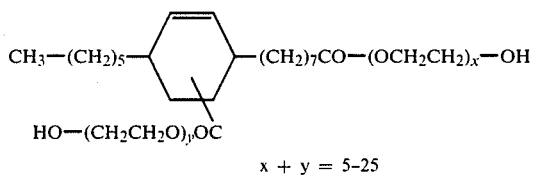

$$x + y = 5\text{-}25$$

The phosphorylated product is readily obtained by reaction with phosphorus pentoxide. The saturated diester can be obtained by nickel-catalyzed hydrogenation.

In the case of the phosphorylated derivative, hydrogenation should precede phosphorylation. The phosphorylated derivatives can be converted to salts thereof by reaction with a metal hydroxide. Sodium and potassium salts are preferred.

Compounds in which R is $ArCOO(CH_2CH_2O)_nCH_2CH_2—$, etc. are obtained by treating polyoxyalkylene intermediates with an aromatic acid, e.g., benzoic, toluic or metallic acid, usually with an acidic catalyst. Hydrogenation of the double bond in the cycloaliphatic ring can be done before or after esterification with the aromatic acid.

Representative of substituted alkyl R which may be used in the products of this invention are butoxybutyl, 10-hydroxystearyl, 10-hydroxydecyl, 10-halostearyl, $\omega$-alkanoyloxyalkyl or the like.

Preferred diesters for use in accordance with the principles of the invention are those wherein:

(a) R is straight or branched chain alkyl of 4-20 carbon atoms, (b) R is 2-ethylhexyl, lauryl or stearyl, (c) R is $HO(CH_2CH_2O)_nCH_2CH_2—$, (d) R is $HO(C_3H_6O)_nC_3H_6—$, (e) R is $HO(C_2H_4O)_p(C_3H_6O)_qC_3H_6—$, (f) R is $(HO)_2P=O(OCH_2CH_2)_nOCH_2CH_2—$ or a salt thereof, (g) R is $C_6H_5CO(OC_2H_4)_nOC_2H_4—$, (h) R is $CH_3C_6H_4CO(OC_2H_4)_nOC_2H_4—$ (i) R is $C_6H_5CO(OC_3H_6)_nOC_3H_6—$, and (j) R is $CH_3C_6H_4CO(OC_3H_6)_nOC_3H_6—$.

"Dyeing assistant agent," as used in the specification and claims, includes alkoxylated alkylphenols and their esters, alkoxylated castor oil compounds, alkoxylated hydrogenated castor oil compounds, alkoxylated primary alkanols, salts of phosphated alkoxylated primary alkanols and mixtures thereof.

The amount of dyeing assistant agent, employed in the compositions of this invention, is at least about 0.5% by weight of the composition. However, it is preferred that the compositions contain at least 5%, more preferably up to about 80% by weight, of dyeing assistant agent. Preferred compositions can also contain 60-80% by weight of dyeing assistant agent.

Preferred dyeing assistant agents are alkoxylated alkylphenols and their esters. These are compounds of the formula

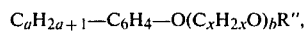

$$C_aH_{2a+1}—C_6H_4—O(C_xH_{2x}O)_bR'',$$

wherein a is 1-12; b is 1-24; R" is H, aroyl of mono- or bicyclic aromatic acids of up to 15 carbon atoms or substituted or unsubstituted alkanoyl of 8-30 carbon atoms. Accordingly, exemplary dyeing assistant agents include ethoxylated and propoxylated alkyl phenols and corre-sponding esters, such as the laurate, myristate, palmitate, coconate, oleate, stearate, isostearate, benzoate and toluate esters. Preferred alkylphenols are nonylphenol, octyphenol, and dodecylphenol.

It will be understood that the alkylphenols and the acids used to esterify the alkoxylated alkylphenols can include mixtures.

Most preferably, the alkoxylated alkylphenols will be ethoxylated derivatives, having 5-10 ethylene oxide units.

Preferred dyeing assistant agent will be those wherein:

(a) R" is alkanoyl of 12-18 carbon atoms, including mixtures thereof;

(b) R" is n—$C_{17}H_{33}CO$;

(c) R" is n—$C_{17}H_{35}CO$;

(d) R" is iso—$C_{17}H_{35}CO$;

(e) R" is benzoyl;

(f) R" is n—$C_{11}H_{23}CO$;

(g) R" is H;

(h) a is 5-10, including each of (a)-(g);

(i) b is 6-15, including each of (a)-(h);

(j) b is 8-11, including mixtures thereof and including each of (a)-(h);

(k) a is 9, b is 8-10 and R" is n—$C_{11}H_{23}CO$;

(l) a is 9, b is 6-10 and R" is H and (m) x is 2, including each of (a)-(l).

Alkoxylated castor oil used as an optional additive in the compositions of this invention will contain 15-100 oxyalkylene units, preferably 40-85 oxyethylene units. The hydrogenated castor oil derivatives will contain 5-200 oxyalkylene units, preferably 20-30 oxyethylene units. These types of materials can be purchased from ICI America and Whitestone Chemical Co.

It surprisingly appears that the vehicles for the dye compositions of this invention essentially act as heat transfer agents and that, in addition to the specifically disclosed vehicles, any vehicle can be used for waterless dyeing of nontextile and general-utility articles, provided that the vehicle is high boiling, thermally stable above at least 100° C. and non-smoking and is free of glycols, glycol ethers, lower alkyl phthalates or dialkyl carbonates. The vehicles are also free of halogenated hydrocarbons or polyhydric alcohols.

It is preferred that compositions, stable above 120° C., more preferably those stable above 140° C., be selected.

The types of plastic materials which can be colored using the compositions and method of this invention include, but are not limited to, polyesters, polyamides, polyurethanes, acrylics, halogenated polyolefins and epoxy plastics.

Polyester articles include those made from poly(alkylene terephthalates), such as poly(ethylene terephthalate), or polyesters made from cyclohexanedimethanol. Typical of polyester articles are chips of polyester resin, polyester coating on wires or metal, flowers, polyester film, toys, glass-filled polyester articles, including styrenated polyester articles, components of cars and planes and housings for pencils and pens.

Polyamides particularly contemplated as substrates in the practice of this invention include those known as nylons, 6; 6,6 or 6,10. Articles which can be colored in accordance with the invention include the same types of articles as for polyesters, as well as ropes.

Acrylic plastics, contemplated within the scope of this invention include straight acrylics, such as polyacrylonitrile, and modacrylics. The latter are copolymers of acrylonitrile or methacrylonitrile, generally with vinyl chloride or vinylidene chloride. Also included within the classification of acrylics are high impact resins, whether comprising blends or graft copolyers, such as are commonly identified as ABS (acrylonitrile, butadiene, styrene resins). Articles made of these types of resins include resin chips, coatings on metal or wire, telephones, toys, impact-resistant moldings for cars and planes, housings for pencils and pens and kitchen utensils.

Polyurethanes include a myriad of compositions, made by reaction, for example, between glycols and organic di- or polyisocyanates. Among the glycols, used to make polyurethanes, are simple glycols, such as the alkylene glycols, and polymeric glycols, including polyether and polyester glycols. Articles containing polyurethane, used in articles generally as above, particularly including toys and moldings and extrusions for automobiles and aircraft.

Halogenated polyolefins include polyvinyl chloride and polyvinylidene chloride, including their copolymers. Also included among halogenated polyolefins are post-chlorinated materials, such as chlorinated polyethylene (CPE) and post-chlorinated PVC. These resins are commonly employed in pipes and tubing, for above and below ground installation, for wire and metal coating, for building sidings and for films.

Epoxy resins are the reaction products of a polyglycidyl ether and a curing agent, particularly a polyamine. These resins often have very high impact resistance and will, accordingly, be used in fiberglass filled compositions for boats and automobiles.

In some instances, the foregoing types of plastics can be blended with natual or synthetic cellulosic materials and colored according to this invention.

"Organic colorant," as used in the specification and claims, includes both dyes and pigments of any structure. Normally, the dyes or pigments which are employed need not be soluble in water. Therefore, such dyes and pigments will not usually contain water-solubilizing functions, such as a plurality of sulfonic acid groups. The dyes or pigments used in the practice of this invention generally will be chosen from among water-insoluble dyes, which are also known as disperse dyes. Included within this class of dyes, which can be used on fibers such as cellulose acetate, polyamides or polyesters, from any kind of dyeing medium are colors having azo, azomethine, nitroarene and anthraquinone structures. It is to be understood that the dyes useful in the practice of this invention are not limited to these classes of compounds.

The dyes or pigments used in the practice of this invention may be identified by their chemical names, for example:

3-nitro-$N^4$-phenylsulfanilanilide, a yellow dye; p-[p-(phenylazo)phenylazo]phenol, a red-yellow dye; ethyl 4-hydroxy-1-anthraquinonecarbamate, an orange dye; 1-amino-4-hydroxyanthraquinone, a red dye; 1-amino-2-bromo-4-hydroxyanthraquinone, a red-blue dye or 4,5-diaminochrysazin, a blue dye.

Alternatively, the dyes may be identified by standard chemical textbooks, such as "The Color Index," third edition, The Society of Dyes and Colours and The American Association of Textile Chemists and Colorists (1971). This type of handbook correlates dye structure with trade names. Typical of colorants thus identified, which dyes can be used in the practice of this invention, are Solvent Orange 20; Acid Blue 83 (C.I. 42660); Acid Blue 59 (C.I. 50315); Direct Blue 86 (C.I. 74810); Direct Red 81 (C.I. 28160) and Acid Yellow 36 (C.I. 13065).

Cationic dyestufffs can also be used in the practice of this invention, for example, Rhodamine 6G, Rhodamine B, Rhoduline Blue 6G and Methylene Blue BB.

Similarly, metallized azo dyestuffs can be employed in the practice of this invention. Representative azo dyestuffs which can be used are Co, Ni, Cu or Cr complexes of coupling products of 2-amino-4-nitrophenol and resorcinol; 2-amino-4-chloro-5-nitrophenol and acetoacetanilide; dianisidine and 3-hydroxy-2-naphthanilide; 2-amino-4-chloro-5-nitrophenol and 2-aminonaphthalene or the like.

It will further be understood that other textile-treating agents, such as optical brighteners, e.g., styrylnaphthoxazole compounds, can be applied, along with dyes or pigments.

The dyes or pigments can be used in any form, that is, as presscake or as dried pressed dye. The addition of dispersing agents is optional. Alternatively, the dyes or pigments can be added to the dye bath in a solvent or dispersing medium, compatible with the dye bath. It is convenient and preferred, in the practice of this invention, to use additive-free, solid disperse dyes.

It has been found, in accordance with this invention that articles can be dyed or colored very rapidly and very homogeneously. Normally, immersion in the dye bath for as little as 30 seconds at 160° C. will give significant coloration. However, for even faster results, the dyeings can be done at 180°-200° C. or higher. Employing the compositions of this invention at 200° C. or more does not result in smoking or pollution of the processing plant, which is a problem when ethylene glycol or diethylene glycol are the dyeing solvents. In practice, it is feasible to use a temperature, up to that at which the plastic article will begin to degrade. However, temperatures of 120°-235° C., more preferably, 140°-235° C., are recommended.

Although it is preferred to dye the articles being treated by immersion in a bath of the dye composition, the dyes can also be applied by spraying. Then, the sprayed articles should be heated in a bath to at least 140° C. to complete uptake of the dye into the article.

Whether the article is dyed by immersion or otherwise, the dye article is normally cleaned with a solvent to remove excess dye. Preferably, the solvents used for cleaning are chlorinated or fluorinated hydrocarbons. However, highly chlorinated solvents, such as perchloroethylene and trichloroethylene are preferred when cleaning is to be done in a liquid bath. When vapor-phase cleaning is to be done, a more volatile solvent, particularly a chlorofluorocarbon, such as dichlorodifluoromethane or chlorotrifluoromethane, will be selected. Normally, means will be used to recover and recycle the cleaning solvent, rather than discharging it to the atmosphere.

A further advantage of the process of the invention is that it is essentially self-contained and effluent free, that is, little or no material is lost or discharged to the atmosphere.

In the apparatus of this invention, as shown in FIG. 1, the major components include a dip tank, a dye recovery unit, a solvent cleaning tank, a solvent recovery still and a drier. The dip tank will be provided with heating means and stirring means, as as to permit circulation of the dyeing solution within the dip tank and to a dye recovery unit external thereto.

The dye recovery unit normally includes filtration means for removal of solid debris from used dye solutions and distilling and condensing means for recovery of the solvent. The purified dye solution can be recycled to the tip tank, with addition of dye or other additives to provide the desired composition in the dip tank. Alternatively, the purified dye solution can be stored for later use.

It is preferred, in coloring many types of articles, to provide porous belt or squeeze roller means, for removal of excess dye solution from treated articles. The dye removal means employed at this point will be selected according to the shape and size of the articles being colored in the dip tank. The dye solution removed at this point can be cycled to the external recovery unit or can be returned directly to the dip tank.

Articles leaving the squeeze roll or belt station are passed into the solvent cleaning tank to complete removal of any excess or unadherent dye matter. It is preferred to use a plurality of solvent cleaning tanks. It is also preferred to circulate solvent from the tank through an external solvent recovery unit, provided with filters to remove solid materials and distilling and condensing means for purifying solvent, and to return purified solvent to the system. Dye recovered on the filter or as the distillation residue can be returned to the system for recycle. When a plurality of solvent cleaning tanks are employed, it is preferred to flow solvent countercurrently to the direction in which the articles being treated, are moved.

The final component of the apparatus is the drying means, such as an air dryer, from which articles leaving the system can be inspected and packaged. Solvent vapors from the hot air dryers can be condensed and returned to the system.

BEST MODE FOR CARRYING OUT THE INVENTION

Figure 1:
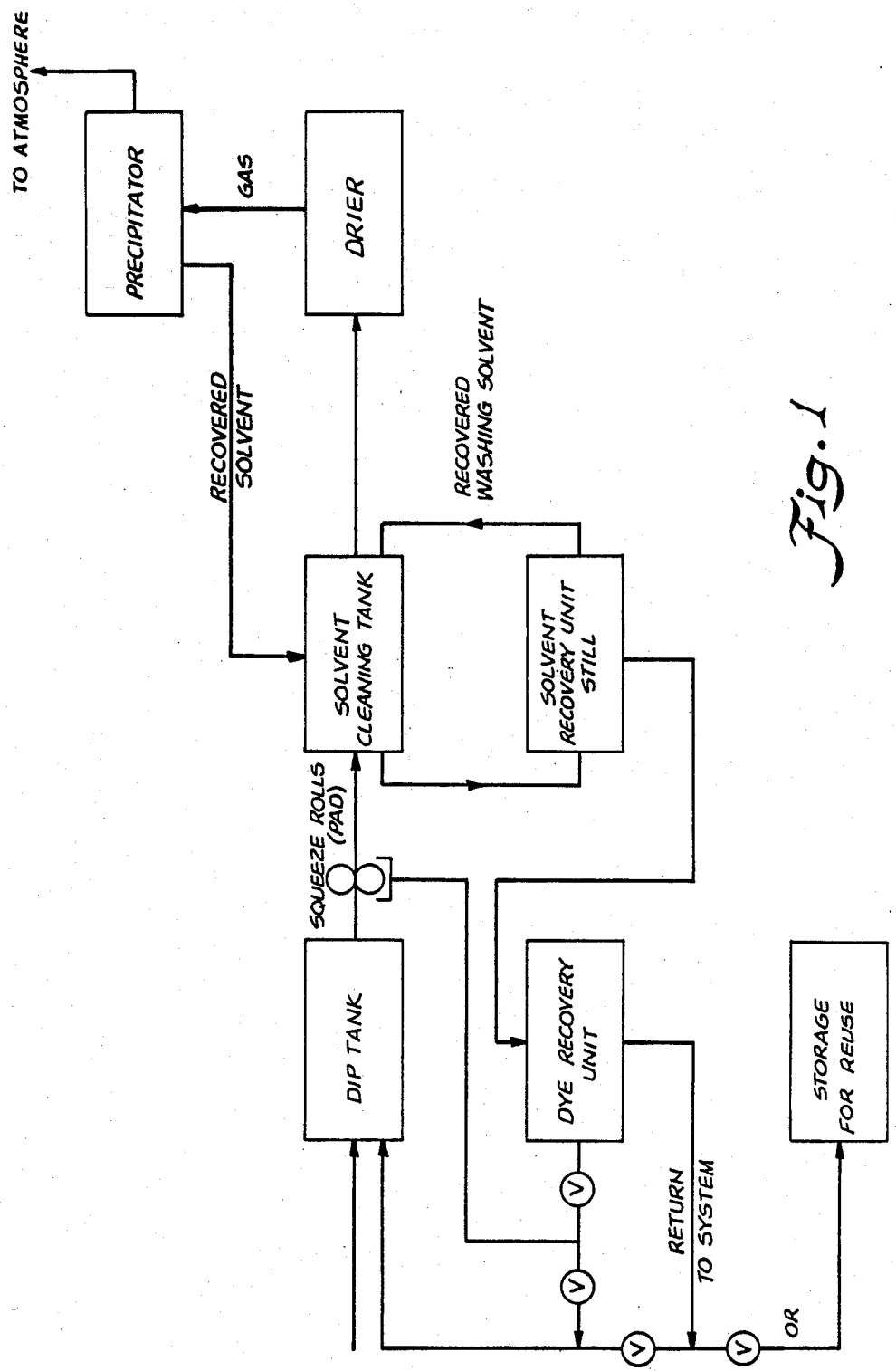
In FIG. 1 is shown an apparatus, suitable for use in accordance with the invention.

In a most preferred aspect, the compositions of this invention will be those wherein the aromatic ester is of the formula $(ArCOO)_z$—$R_3$, Ar is phenyl or tolyl, $R_3$ is the residue of glycerol, trimethylolpropane or pentaerythritol and the composition contains at least 5% by weight of an alkoxylated alkylphenol or an ester thereof. Most preferably, the compositions will contain at least 5% by weight of a hydrogenated cycloaliphatic diester, obtained from linoleic acid and acrylic acid, and the organic colorant will be a disperse dye.

A most preferred process in accordance with this invention is one wherein the article being treated is exposed to the foregoing composition, maintained at a temperature of 140°–235° C., for a time adequate to achieve the desired degree of coloration.

Without further elaboration, it is believed that one skilled in the art can, using the preceding description, utilize the present invention to the fullest extent. The following specific embodiments are, therefore, to be construed as merely illustrative and no limitative of the remainder of the disclosure in any way whatsoever. In the following examples, the temperatures are set forth uncorrected in degrees Celsius. Unless otherwise indicated, all parts and percentages are by weight.

EXAMPLE 1

Preparation of Propylene Glycol Dibenzoate

To a 3-necked flask fitted with stirrer, condenser, receiver, thermometer, nitrogen purge and heating mantle were charged 84 g (1.1 mole) of propylene glycol, 244 g (2 moles) of benzoic acid and 0.8 g of p-toluenesulfonic acid. Air was purged from the flask with nitrogen and the contents of the flask were heated to 160°–170° C. Water formed by the reaction was removed continuously. The reaction was continued until the product had an acid value below 5 mg KOH/g. The product was cooled and filtered.

Other esters are prepared using the following reactants:

(1) dipropylene glycol and benzoic acid, 1:2 molar ratio
(2) PPG 200 and benzoic acid, 1:2 molar ratio
(3) PPG 500 and benzoic acid, 1:2 molar ratio
(4) glycerol and benzoic acid, 1:3 molar ratio
(5) pentaerythritol and toluic acid, 1:4 molar ratio
(6) trimethylolpropane and mixture of benzoic and toluic acids, 1:3 molar ratio.

EXAMPLE 2

Preparation of Polyoxyethylene Nonylphenyl Laurate

To a three-necked flask fitted out as in Example 1 was charged 750 g (1.1 moles) of polyoxyethylated nonylphenol (9.5 moles of oxyethylene, NP 9.5), 208 g (1 mole) of lauric acid and 2.4 g of p-toluenesulfonic acid. Air was purged from the flask with nitrogen and the mixture was heated to 160°–170° C. until an acid value below 10 mg/KOH was obtained. The product was cooled and filtered.

Other polyoxyethylene compounds are made in a similar fashion from:

(1) NP 9.5 and coconut fatty acid, 1:1 molar ratio
(2) NP 9.5 and oleic acid, 1:1 molar ratio
(3) NP 9.5 and stearic acid, 1:1 molar ratio
(4) NP 9.5 and benzoic acid, 1:1 molar ratio.

EXAMPLE 3

Preparation of Unsaturated Cycloaliphatic Diester: (R is 2-ethylhexyl)

To a three-necked flask fitted with stirrer, thermometer, nitrogen purge, condenser, side-arm receiver and heating mantle were charged 352 g (1 mole) of Diacid 1550, 273 g (2.1 moles) of 2-ethylhexanol, 1.5 g of p-toluenesulfonic acid and 2 g of decolorizing carbon. Air was purged from the flask with nitrogen and the reaction mixture was stirred and heated to 160°–170° C. for 4–6 hours. Water formed during the reaction was collected in the side-arm receiver. The reaction was continued until the acid value was below 5 mg KOH/g. The catalyst and carbon was removed by filtration. The ester product and 25 grams of nickel on kieselguhr were charged to a stirred, heated pressure vessel. The mixture was heated to 160°–170° C. and pressurized to 400 psig with hydrogen. A sample was removed after 6–8 hours for determination of the iodine value. The reaction was continued until the iodine value was below 0.5 g of iodine/100 g of sample.

The product was cooled to 50° C. and the catalyst was removed by filtration.

Esters are prepared similarly from:
(1) Diacid 1550 and decyl alcohol, 1:2 molar ratio
(2) Diacid 1550 and tridecyl alcohol, 1:2 molar ratio
(3) Diacid 1550 and Neodol 25 (a mixture of 12–15 carbon alcohols), 1:2 molar ratio.

EXAMPLE 4

A. Preparation of Polyoxyethylene Unsaturated Cycloaliphatic Diester: (R is HO(CH$_2$CH$_2$O)$_n$CH$_2$CH$_2$—)

To a stirred autoclave fitted with heating and cooling coils was charged 352 g (1 mole) of Diacid 1550. Catalyst (1.0 g of potassium hydroxide) was charged to the reactor. The temperature was raised to 110° C. and the reactor was vacuum stripped for 30–60 minutes to remove any residual water from previous washing of the reactor or from one or more of the charged reactants or catalyst. The reactor was purged with nitrogen to remove air, evacuated again and purged again with nitrogen. The contents of the reactor were stirred and heated to 140° C. and 100 g (2.3 moles) of ethylene oxide was added to the reactor. The pressure inside the reactor immediately built up to 30–50 psig. After 30–60 minutes' induction time, an exothermic polymerization reaction (to 150°–160° C.) began. The reaction was accompanied by a pressure drop to zero (0 psig) as the ethylene oxide was consumed. Ethylene oxide was added to the reactor to a total of 660 g (15 moles). The temperature was maintained at 150°–160° C. by cooling. Addition of ethylene oxide was stopped and the reaction was allowed to continue for 30 minutes more. The reactor was cooled to 90°–100° C. and purged twice with nitrogen.

A sample of the product had a hydroxyl value of 110 mg of KOH/g (15 moles of ethylene oxide added to the diacid.) The diester was acidified with acetic acid to neutralize the potassium hydroxide catalyst and treated with 3 g of hydrogen peroxide to bleach and lighten the color of the product. The reactor was cooled to 30° C. prior to removing the product, which was filtered through filter paper, using a porcelain filter.

B. Reduction to the Polyoxyethylene Diester

The product of Example 4A and 25 g of nickel on kieselguhr were charged to a stirred, heated pressure vessel. The mixture was heated to 160°–170° C. and pressurized with hydrogen to 400 psig. After 6–8 hours, samples were removed at intervals for determination of the iodine value. The reaction was continued until the iodine value was less than 0.5 g/100 g of sample.

EXAMPLE 5

Preparation of Phosphated Polyoxyethylene Diester: (R is (HO)$_2$P(=O)(OCH$_2$—CH$_2$)$_n$OCH$_2$CH$_2$—)

Polyoxyethylated (15 moles of ethylene oxide) diacid, obtained as in Example 4B was heated to 50°–60° C., stirred and purged thoroughly with nitrogen to remove air. To about 1015 g (1 mole) of this material was added 24 g (0.17 mole) of phosphorus pentoxide. An exothermic reaction began immediately, with an exotherm to 85°–95° C. The reaction mixture was maintained at this temperature by cooling and an additional 24 g (0.17 mole) of phosphorus pentoxide was added. The reaction was continued for three hours after all of the phosphorus pentoxide was added. The reactor was cooled to 50° C. prior to removal of a sample. The acid value of the product was 32 mg KOH/g, indicating that the reaction was complete. The batch was bleached at 85°–95° C. with 5 g of hydrogen peroxide, cooled to 30° C. and filtered.

EXAMPLE 6

Aroylpolyoxyethylene Cycloaliphatic Diester

An aroylpolyoxyethylene cycloaliphatic diester was synthesized in a two-liter autoclave fitted with nitrogen purge, condenser and receiver for the removal of by-product water. Charge weights were:

| | |
|---|---|
| 510.0 g. | Diacid 1550 |
| 2.0 g. | flake caustic |
| 636.0 g. | ethylene oxide |

After purging the system with nitrogen, Diacid 1550 and caustic were heated to 130° C. Ethylene oxide was added over a four-hour period, during which the temperature was kept at 150°–165° C. The resulting ethoxylated product was cooled to 90° C. for removal of a sample. The (by hydroxyl value) was 139. To this intermediate was added:

| | |
|---|---|
| 3.5 g. | acetic acid (glacial) |
| 7.5 g. | methanesulfonic acid (70%) |
| 340.0 g. | benzoic acid |

After purging with nitrogen, the temperature of the mixture was raised to and held at 165°–170° C. until the acid value was less than 5 mg KOH per gram. The theoretical amount of water was removed during the reaction and collected in the receiver. The sample was cooled and filtered.

The filtered product was hydrogenated in a two-liter autoclave:

| | |
|---|---|
| 1000.0 g | ethoxylated product, above |
| 50.0 g | Raney nickel |
| QS | hydrogen |

The reduction was run at 100°–125° C. and 200–250 psig until hydrogen consumption ceased. The product was cooled and filtered.

A propoxylated dibenzoate ester was prepared in a similar fashion.

EXAMPLE 7

A representative benzyl ester was prepared from:

| | |
|---|---|
| 227.0 g | benzyl alcohol |
| 400.0 g | lauric acid |
| 2.24 g | methanesulfonic acid (70%) |
| 0.6 g | hypophosphorous acid (50%) |

The resulting mixture was heated and held at 165°–175° C. until the theoretical amount (37 g) of water was removed. Approximately 580 grams of benzyl laurate were recovered.

The benzyl esters of pelargonic, octanoic, palmitic, stearic, oleic and hydroxystearic acids were prepared in a similar fashion.

EXAMPLE 8

Ethoxylated castor and hydrogenated castor oils were prepared as in Example 4. Ethylene oxide adds to the hydroxyl group of castor oil.

EXAMPLE 9

A waterless dyeing composition was prepared from glyceryl tribenzoate (Velsicol Chemical Corp.) and nonylphenol 7 (7 oxyethylene units, Union Carbide Corp.) in 20:80 weight ratio, containing 1 gram/liter of presscake blue dye.

This composition was kept at 180° C. and stirred while a fiberglass-polyester composite was immersed therein for one minute. The sample was removed, washed in perchloroethylene and dried. The sample was homogeneously colored with good dye fixation. There was little or no smoking during the coloring operation.

EXAMPLE 10

Compositions similar to that of Example 9 were used to color the following articles, under the conditions indicated:

(a)

180° C., 2 min
nylon ring
electrical cord
screen wire
nylon beads
nylon cord (b)

180° C. for 3 min
PVC pipe (c)

180° C. for 5 min
polyester chunk

In each case, the article was colored evenly. No splotches were observed. The products were cleaned easily with perchloroethylene.

EXAMPLE 11

(a) Dye solution comprising ethylene glycol, containing 1 gram/liter of pure presscake blue dye, was heated to 180° C. with constant stirring. The solution began to smoke at about 107° C. Smoking became very troublesome at 125° C. and even worse at 180° C.

Into the solution at 180° C. was immersed a six-inch piece of polyester zipper. After one minute's immersion, the zipper was removed, cooled in air and cleaned in perchloroethylene solution, to remove residual dye solution. The zipper was difficult to clean. The zipper was unevenly colored and had many splotches.

(b) A similar experiment was done, using diethylene glycol as solvent. The dyed product was unevenly dyed and had many splotches.

These experiments demonstrate that use of glycol solvents are unacceptable from a pollution standpoint and that unacceptable dyeings are obtained.

EXAMPLE 12

A 3/16 inch stainless steel tank of 70 gallon capacity containing 520 pounds of dip dye solution, as in Examples 9 and 10, at a dye level of 0.5 pound of Latyl Blue BCN 356 (crude ground dye) was heated externally to provide a temperature of 182° C.

A pump was used to circulate material in the dye bath during heating and while a polyester zipper about two feet long was immersed in the stirred bath for about 30 seconds. The zipper was removed from the bath and lightly squeezed with a roller to remove excess dye solution. The zipper was washed in a tank containing a mixture of trichloroethylene and perchloroethylene. After 30 seconds' immersion in the bath, the zipper was dried in a hot air chamber. The zipper was ready for final inspection and shipment.

The zipper was rapidly dyed by this method and was pleasant in appearance.

EXAMPLE 13

Dip dye solution is made from the following ingredients, as above:

| parts by weight | |
|---|---|
| 40 | hydrogenated cycloaliphatic diester with 2-ethylhexyl alcohol (Example 3) |
| 40 | propylene glycol dibenzoate |
| 20 | POE nonylphenyl laurate (Example 2) |
| 1 | Latyl Blue BCN 356 |

The dip dye is used as in Examples 9 and 10. Similar results are obtained.

EXAMPLE 14

Dip dye solution is made as above from:

| | parts by weight | |
|---|---|---|
| (a) | 20 | POE nonylphenol (N.P. 8.5) |
| | 50 | glyceryl tribenzoate |
| | 30 | hydrogenated cycloaliphatic diester of Example 3 (Neodol 25) |
| | 2 | presscake blue |
| (b) | 10 | hydrogenated cycloaliphatic diester of Example 3 (decyl alcohol) |
| | 50 | diethylene glycol ditoluate |
| | 50 | ethoxylated octylphenol oleate |
| | 1 | presscake yellow dye |
| (c) | 50 | benzyl benzoate |
| | 10 | hydrogenated cycoaliphatic diester with 2-ethylhexanol |
| | 40 | ethoxylated dodecylphenol |
| | 1.5 | presscake green dye |

The foregoing compositions are used for coloration of general-utility articles, with results similar to those obtained above.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

4,661,117

1. A waterless dip dye composition for non-textile and general utility articles, made from plastic, comprising an aromatic ester of the formula $ArCOOR_2$, $ArCOO-R_1-OOCAr$ or $(ArCOO)_z-R_3$, wherein $R_1$ is alkylene of 2-8 carbon atoms or polyoxyalkylene of the formula $-C_rH_{2r}(OC_rH_{2r})_s$, in which r is 2 or 3 and s is 1 to 15; $R_2$ is substituted or unsubstituted alkyl or alkenyl of 8-30 carbon atoms; $R_3$ is the residue of a polyhydric alcohol having z hydroxyl groups; Ar is substituted or unsubstituted mono- or bicyclic aryl of up to 15 carbon atoms and z is 3-6, admixed with at least about 0.5% by weight of a dyeing assistant agent and an organic colorant.

2. The composition of claim 1, wherein the dyeing assistant agent is an alkoxylated alkylphenol or an ester thereof.

3. The composition of claim 1, wherein the aromatic ester is $(ArCOO)_zR_3$.

4. The composition of claim 3, wherein z is 3 or 4.

5. The composition of claim 1, wherein the dyeing assistant agent is an alkoxylated alkylphenol or an ester thereof and constitutes at least 5% by weight of the composition.

6. The composition of claim 1, wherein the dyeing assistant agent is an alkoxylated alkylphenol or an ester thereof and constitutes up to about 80% by weight of the composition.

7. The composition of claim 3, which further comprises an alkoxylated castor oil compound, an alkoxylated hydrogenated castor oil compound, an alkoxylated primary alkanol, a salt of a phosphated alkoxylated primary alkanol or a mixture thereof.

8. The composition of claim 3, wherein Ar is phenyl or tolyl; $R_3$ is the residue of glycerine, trimethylolpropane or pentaerythritol and the composition contains at least 5% by weight of an alkoxylated alkylphenol or an ester thereof.

9. The composition of claim 3, wherein Ar is phenyl or tolyl; $R_3$ is the residue of glycerine, trimethylolpropane or pentaerythritol and the composition contain up to about 80% by weight of an alkoxylated alkylphenol or an ester thereof.

10. The composition of claim 1, wherein the organic colorant is a disperse dye.

11. A process for coloring non-textile and general-utility articles, made from plastic, comprising exposing an article being treated to a composition of claim 1, maintained at a temperature from about 100° C. to the temperature at which the plastic degrades, for a time adequate to achieve the desired degree of coloration.

12. The process of claim 11, wherein the article is made from polyester, polyamide, polyurethane, an acrylonitrile or methacrylonitrile polymer, halogenated polyolefin or epoxy plastic.

13. The process of claim 11, wherein the article is immersed in the coloring composition at a temperature of at least 140° C. for at least 1 minute.

14. The process of claim 11, wherein the article is sprayed with the coloring composition and heated in a bath or oven to at least 140° C.

15. The process of claim 11, including the further steps of cleaning the colored article with a halogenated solvent and drying the thus-cleaned article.

16. The process of claim 15, wherein the halogenated solvent is perchloroethylene or trichloroethylene and the halogenated solvent is collected and recycled to the process.

17. A process for coloring non-textile and general-utility articles, made from polyester, polyamide, polyurethane, an acrylonitrile or methacrylonitrile polymer, halogenated polyolefin or epoxy plastic, comprising exposing an article being treated to a waterless coloring composition of claim 3, maintained at 120°-235° C., for a time adequate to achieve the desired degree of coloration.

18. The process of claim 17, wherein the article is immersed in the coloring composition at a temperature of at least 140° C. for at least 1 minute.

19. The process of claim 17, including the further steps of cleaning the colored article with a halogenated solvent and drying the thus-cleaned article.

20. A process for coloring non-textile and general-utility articles, made from polyester, polyamide, polyurethane, an acrylonitrile or methacrylonitrile polymer, halogenated polyolefin or epoxy plastic, comprising exposing the article being treated to a composition of claim 8, maintained at a temperature from about 100° C. to the temperature at which the plastic degrades, for a time adequate to achieve the desired degree of coloration.

21. The process of claim 20, wherein the article is immersed in the coloring composition at a temperature of at least 140° C. for at least one minute.

22. A process for coloring non-textile and general-utility articles made from plastic comprising exposing an article being treated to a waterless liquid composition including a high boiling ester, and an organic colorant, maintained at about 120°-235° C. for a time adequate to achieve the desired degree of coloration.

23. A process for coloring non-textile and general-utility articles, made from plastic, comprising exposing the article being treated to a composition of claim 1, wherein the aromatic ester is $ArCOOR_2$ or $ArCOO-R_1-OOCAr$ and the composition contains at least 5% by weight of a cycloaliphatic diester of the formula

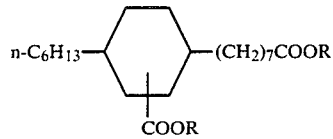

wherein R is substituted or unsubstituted straight or branched chain alkyl of 4-20 carbon atoms, polyoxyalkylene of the formula $R'(OC_xH_{2x})_n$ or phosphated polyoxyalkylene of the formula

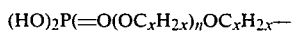

or a salt thereof, wherein $(C_xH_{2x}O)_n$ is $(C_2H_4O)_n-$, $(C_3H_6O)_n-$ or $(C_2H_4O)_p-(C_3H_6O)_q-$; R' is H or ArCO; Ar is substituted or unsubstituted mono- or bicyclic aryl of up to 15 carbon atoms; x is 2 or 3; n is 2-22 and the sum of p+q is n, and maintaining the composition at a temperature from 100° C. to the temperature at which the plastic degrades, for a time adequate to achieve the desired degree of coloration.

24. The process of claim 23, wherein the composition contains at least 5% by weight of dyeing assistant agent selected from an alkoxylated alkylphenol or an ester thereof.

25. The process of claim 23, wherein the composition contains at least 5% by weight of dyeing assistant agent selected from an alkoxylated alkylphenol or an ester thereof and the organic colorant is a disperse dye.

26. The process of claim 23, wherein the composition further comprises an alkoxylated castor oil compound, an alkoxylated hydrogenated castor oil compound, an alkoxylated primary alkanol, a salt of a phosphated alkoxylated primary alkanol or a mixture thereof.

* * * * *